(12) United States Patent
Inaba et al.

(10) Patent No.: US 10,141,102 B2
(45) Date of Patent: Nov. 27, 2018

(54) REACTOR

(71) Applicants: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-shi, Osaka (JP)

(72) Inventors: Kazuhiro Inaba, Mie (JP); Kouji Nishi, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 15/538,743

(22) PCT Filed: Dec. 15, 2015

(86) PCT No.: PCT/JP2015/085047
§ 371 (c)(1),
(2) Date: Jun. 22, 2017

(87) PCT Pub. No.: WO2016/104246
PCT Pub. Date: Jun. 30, 2016

(65) Prior Publication Data
US 2017/0352476 A1    Dec. 7, 2017

(30) Foreign Application Priority Data
Dec. 25, 2014    (JP) ................................ 2014-262705

(51) Int. Cl.
*H01F 27/24*    (2006.01)
*H01F 27/40*    (2006.01)
(Continued)

(52) U.S. Cl.
CPC ............. *H01F 27/402* (2013.01); *G01K 1/14* (2013.01); *G01K 7/22* (2013.01); *H01F 27/24* (2013.01);
(Continued)

(58) Field of Classification Search
CPC ........................................... H01F 27/00–27/36
(Continued)

(56) References Cited

U.S. PATENT DOCUMENTS 6,812,818 B2 * 11/2004 Lee ..................... H01F 27/402
                                                    336/55
2010/0226410 A1    9/2010 Maeno et al.
2014/0133204 A1    5/2014 Yoshikawa

FOREIGN PATENT DOCUMENTS

JP    S6033427 U    3/1985
JP    S6240815 U    3/1987
(Continued)

OTHER PUBLICATIONS

Search Report for International Application No. PCT/JP2015/085047, dated Mar. 1, 2016, 4 pp.

*Primary Examiner* — Tuyen Nguyen
(74) *Attorney, Agent, or Firm* — Honigman Miller Schwartz and Cohn LLP

(57) ABSTRACT

A reactor that can measure the temperature of the magnetic core is provided. The reactor includes an assembly having a magnetic core and a coil that has a winding portion, and a temperature sensor that measures the temperature of the reactor. The magnetic core has an inner core portion that is inserted into the winding portion, and a sensor disposition groove is formed in an outer peripheral face of the inner core portion and is disposed inside the winding portion. The temperature sensor is provided inside the sensor disposition groove. According to this configuration, it is possible to (Continued)

precisely measure the temperature of the magnetic core while the reactor is operating.

7 Claims, 4 Drawing Sheets

(51) Int. Cl.
| | | |
|---|---|---|
| *H01F 37/00* | (2006.01) | |
| *G01K 1/14* | (2006.01) | |
| *G01K 7/22* | (2006.01) | |
| *H01F 27/32* | (2006.01) | |
| *H01F 27/30* | (2006.01) | |

(52) U.S. Cl.
CPC ........... *H01F 27/324* (2013.01); *H01F 37/00* (2013.01); *H01F 27/306* (2013.01); *H01F 2027/406* (2013.01)

(58) Field of Classification Search
USPC .. 336/55–62, 90, 92, 96, 210–215, 233–234
See application file for complete search history.

(56) References Cited

FOREIGN PATENT DOCUMENTS

| JP | S6289113 U | 6/1987 |
|---|---|---|
| JP | 2010203998 A | 9/2010 |
| JP | 2012216741 A | 11/2012 |
| JP | 2012253384 A | 12/2012 |

* cited by examiner

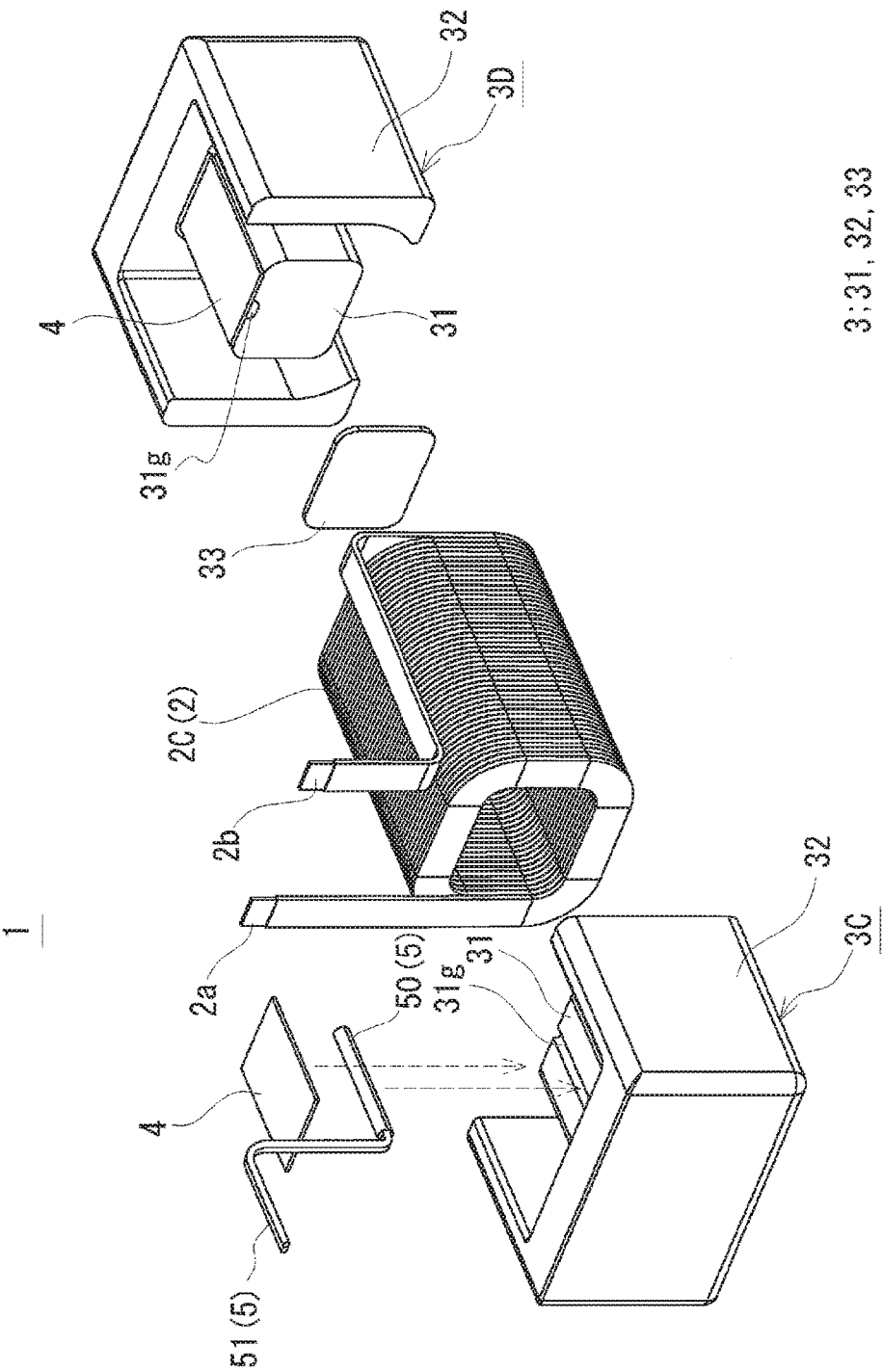

REACTOR

CROSS-REFERENCE TO RELATED APPLICATIONS

This application is the U.S. national stage of PCT/JP2015/085047 filed December, 2015, which claims priority of Japanese Patent Application No. JP 2014-262705 filed Dec. 25, 2014.

TECHNICAL FIELD

The present invention relates to a reactor for use in, for example, a constituent part of a vehicle-mounted DC-DC converter or power conversion apparatus mounted in an electric motor vehicle such as a hybrid automobile.

BACKGROUND

Magnetic components such as a reactor or a motor are used in various fields. As one example of such a magnetic component, a reactor for use in a converter in a hybrid automobile is disclosed in JP 2012-253384A for example.

JP 2012-253384A discloses a reactor that includes: an assembly in which a coil having a pair of winding portions is assembled together with a magnetic core partially disposed inside the winding portions; and a temperature sensor that measures a physical quantity regarding the reactor (typically a temperature sensor that measures the temperature of the coil). In this reactor, the temperature sensor is fixed at a position that is on the upper side of the assembly and between the pair of winding portions. This fixing is performed with use of an insulator (insulating intervening member) that ensures insulation between the coil and the magnetic core. More specifically, the insulating intervening member is provided with a portion for disposing the temperature sensor (housing portion), and the position of the temperature sensor is fixed by disposing the temperature sensor in this housing portion.

In order for a reactor to operate stably, there is a need to be able to precisely measure not only the temperature of the coil, but the temperature of the magnetic core as well. In particular, in the case where the magnetic core is constituted by a composite material that includes a soft magnetic powder and resin, the thermal conductivity of the composite material is not very high, and therefore the temperature of the magnetic core tends to rise easily. If the temperature of the magnetic core rises too high, there is a risk of degradation of the magnetic properties of the magnetic core, and therefore there is desire to be able to precisely measure the temperature of the magnetic core.

The present invention was achieved in light of the above-described circumstances, and an object thereof is to provide a reactor in which the temperature of the magnetic core can be measured precisely.

SUMMARY OF THE INVENTION

A reactor according to one aspect of the present invention is a reactor including: an assembly having a magnetic core and a coil that has a winding portion; and a temperature sensor that measures the temperature of the reactor, wherein the magnetic core has an inner core portion that is inserted into the winding portion, and a sensor disposition groove is formed in an outer peripheral face of the inner core portion and is disposed inside the winding portion, and the temperature sensor is provided in the sensor disposition groove.

According to the above reactor, it is possible to precisely measure the temperature of the magnetic core while the reactor is operating.

BRIEF DESCRIPTION OF DRAWINGS

FIG. 5 is an exploded perspective view of an assembly included in the reactor of the second embodiment.

DETAILED DESCRIPTION OF THE PREFERRED EMBODIMENTS

Description of Embodiments of Present Invention

Figure 1:
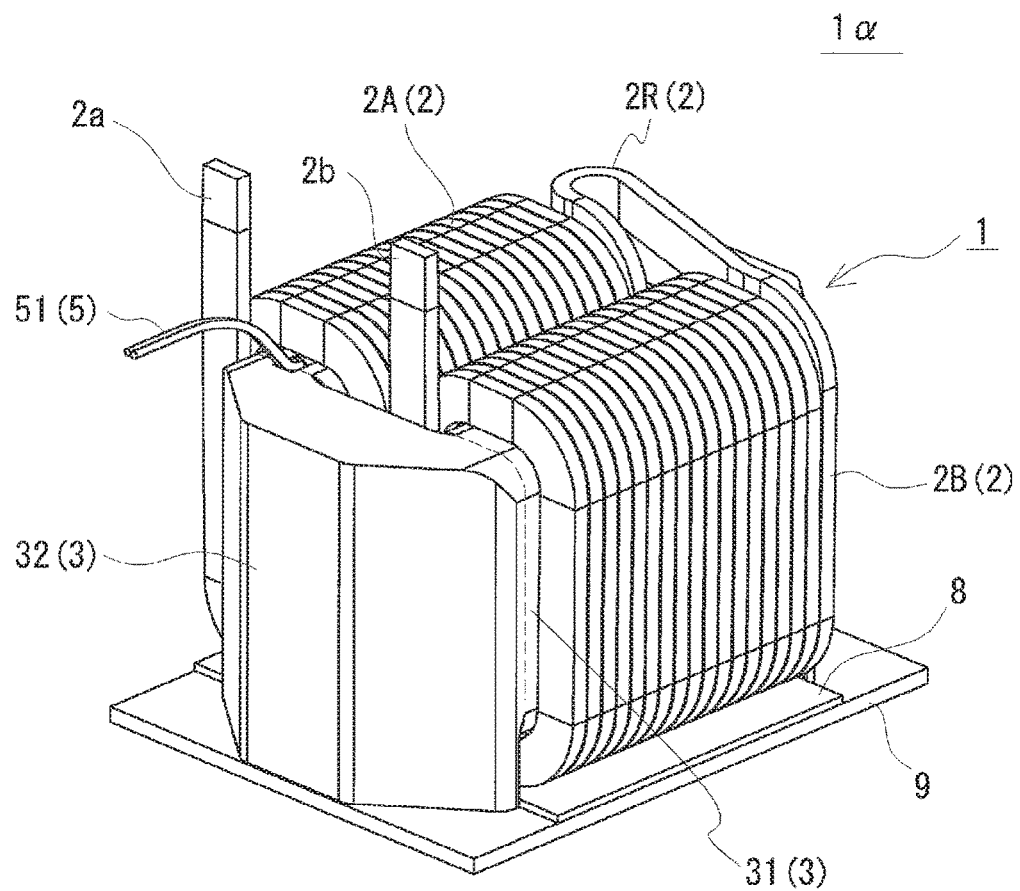
FIG. 1 is a top perspective view of a reactor of a first embodiment.

First, embodiments of the present invention will be listed and described.

<1> A reactor of one embodiment is a reactor including: an assembly having a magnetic core and a coil that has a winding portion; and a temperature sensor that measures the temperature of the reactor, wherein the magnetic core has an inner core portion that is inserted into the winding portion, and a sensor disposition groove is formed in an outer peripheral face of the inner core portion and is disposed inside the winding portion, and the temperature sensor is provided in the sensor disposition groove.

According to this configuration, it is possible to precisely measure the temperature of the magnetic core while the reactor is operating. If it is possible to precisely monitor the temperature of the magnetic core, stable operation of the reactor can be ensured based on the monitoring result.

Also, the above-described reactor is excellent in terms of productivity. This is because by merely disposing the temperature sensor in the sensor disposition groove, the temperature sensor can be disposed at a desired location in the magnetic core, and therefore there is no need to prepare a special member for determining the position of the temperature sensor in the magnetic core.

<2> In another embodiment, the reactor can have a configuration in which the sensor disposition groove extends toward a central side in an axial direction of the winding portion.

In particular, the portion of the magnetic core that reaches a high temperature during operation of the reactor is the portion of the inner core portion, which is covered by the winding portion of the coil, that is located in the center in the axial direction of the winding portion. According to the above-described reactor that includes the sensor disposition groove for guiding the temperature sensor toward this central position, the temperature of the magnetic core can be even more precisely monitored while the reactor is operating, and stable operation of the reactor can be ensured based on the monitoring result.

<3> In another embodiment, the reactor can have a configuration in which the sensor disposition groove is formed in, among outer peripheral faces of the inner core portion, a face that is most distant from an installation target on which the assembly is to be installed.

This reactor is used while attached to an installation target such as a cooling base. Heat generated by the reactor during operation is allowed to escape to the installation target, thus cooling the reactor. The heat transmission path to the installation target is long at the face of the inner core portion that is the most distant from the installation target, and therefore this face tends to reach a higher temperature than other faces. In other words, monitoring the temperature at a position that is on this distant face and in the center in the axial direction of the winding portion may be thought to be substantially equivalent to measuring the highest temperature of the magnetic core. For this reason, providing the temperature sensor at this distant face and monitoring the temperature at this distant face is favorable for ensuring stable operation of the reactor.

<4> In another embodiment, the reactor can include an adhesive sheet that is disposed between an inner peripheral face of the winding portion and the outer peripheral face of the inner core portion in which the sensor disposition groove is formed, covers the temperature sensor provided in the sensor disposition groove, and adheres together the inner core portion and the winding portion.

According to the above configuration, it is possible to fix the relative positions of the coil and the magnetic core, thus making it possible to suppress shifting of the relative positions of the coil and the magnetic core due to vibration or the like. Also, heat generated by the magnetic core can be allowed to escape to the coil via the adhesive sheet, thus making it possible to improve the heat dissipation performance of the reactor. Additionally, the adhesive sheet covers, from the outside, the temperature sensor disposed in the sensor disposition groove, thus making it possible to prevent the temperature sensor from falling out of the sensor disposition groove.

<5> In another embodiment, the reactor can have a configuration in which the inner core portion is constituted by a composite material that includes a soft magnetic powder and a resin.

The amount of soft magnetic powder relative to resin can be adjusted in the composite material, and therefore the magnetic properties of the composite material can be easily adjusted. For this reason, with the composite material, an inner core portion that has desired magnetic properties can be easily produced. The inner core portion constituted by the composite material is formed by cast molding, injection molding, or the like, and therefore the sensor disposition groove can be easily formed in the inner core portion.

<6> In another embodiment, the reactor can have a configuration in which the inner core portion includes a magnetic body and an inner resin mold portion formed on a surface of the magnetic body, and the sensor disposition groove is formed in the inner resin mold portion.

Forming the sensor disposition groove in the inner resin mold portion eliminates a reduction in the magnetic path sectional area of the magnetic body that determines the magnetic properties of the inner core portion. The sensor disposition groove can be easily formed in the inner resin mold portion that is constituted by resin, and therefore the formation of the sensor disposition groove does not greatly impair the productivity of the inner core portion.

Detailed Description of Embodiments of Present Invention

Hereinafter, embodiments of a reactor of the present invention will be described with reference to the drawings. Reference signs that are the same in the drawings denote elements that have the same name. Note that the present invention is not limited to the configurations described in the embodiments, but rather is indicated by the scope of the claims, and all changes that come within the meaning and range of equivalence of the claims are intended to be embraced therein.

1. First Embodiment 1.1 Overall Configuration of Reactor

Figure 2:
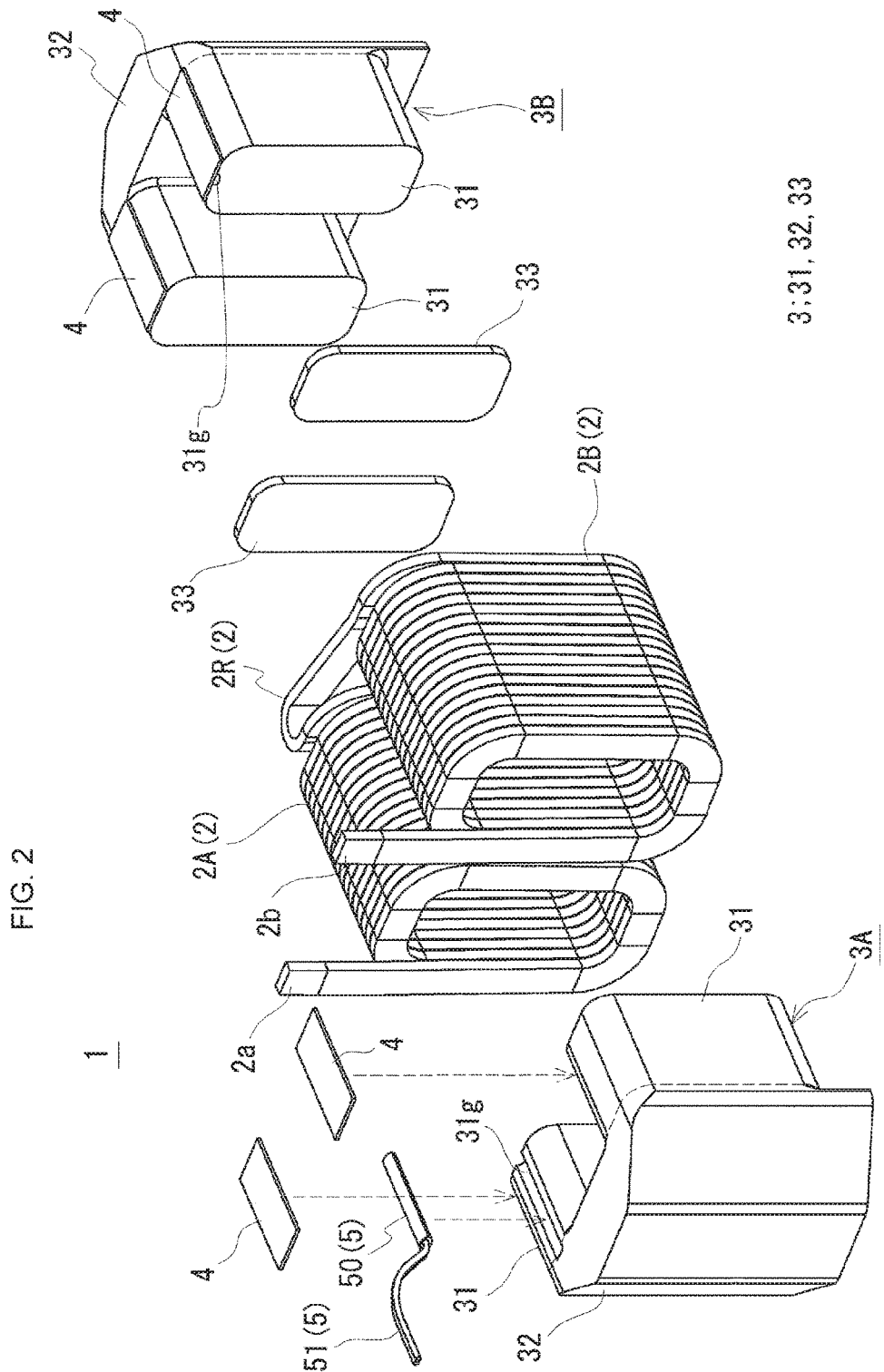
FIG. 2 is an exploded perspective view of an assembly included in the reactor of the first embodiment.
Figure 3:
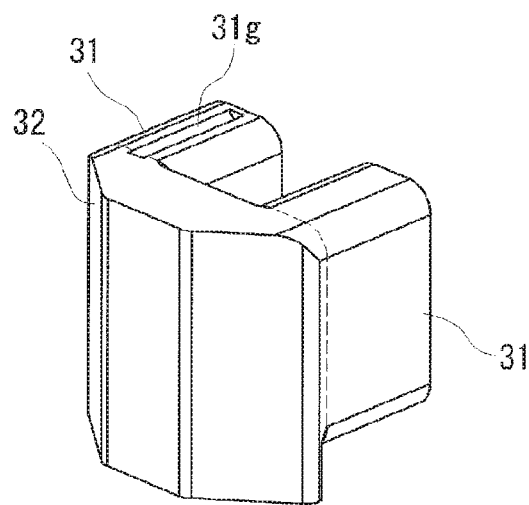
FIG. 3 is a schematic perspective view of a core portion that is different from core portions included in the assembly in FIG. 2.

The following describes a reactor $1\alpha$ of a first embodiment with reference to FIGS. 1 to 3. FIG. 1 is a top perspective view of the reactor $1\alpha$, and FIG. 2 is an exploded perspective view of an assembly 1 included in the reactor $1\alpha$. FIG. 3 is a schematic perspective view of a core portion that is different from core portions 3A and 3B included in the assembly 1 in FIG. 2.

The reactor $1\alpha$ of the present embodiment shown in FIG. 1 has a configuration in which an assembly 1 having a coil 2 and a magnetic core 3 is fixed on a mounting plate 9 via a junction layer 8. A main difference that the reactor $1\alpha$ of this embodiment has from a conventional reactor is that a sensor disposition groove 31g (see FIG. 2) for disposition of a temperature sensor 5 is formed in the magnetic core 3 as will be described later. Configurations of the reactor $1\alpha$ will be described in detail below.

1.2 Assembly

The assembly 1, in which the coil 2 and the magnetic core 3 are mechanically assembled together, will be described mainly with reference to the exploded perspective view in FIG. 2.

1.2.1 Coil

The coil 2 of the present embodiment includes a pair of winding portions 2A and 2B and a joining portion 2R that joins the winding portions 2A and 2B. The winding portions 2A and 2B are shaped as hollow tubes and have the same number of turns and the same winding direction, and are aligned such that their axial directions are parallel to each other. Also, the joining portion 2R is a portion that is bent into a U shape and connects the winding portions 2A and 2B. This coil 2 may be formed by winding a single winding wire having no joining portion into a spiral, or may be formed by producing the winding portions 2A and 2B using separate winding wires, and then joining end portions of the winding wires of the winding portions 2A and 2B to each other by welding, crimping, or the like.

The winding portions 2A and 2B of the present embodiment are shaped as rectangular tubes. The rectangular tube-shaped winding portions 2A and 2B are winding portions whose end faces are shaped as a quadrangle (include a square) having rounded corners. Of course, the winding portions 2A and 2B may be shaped as circular tubes. A circular tube-shaped winding portion is a winding portion whose end face is shaped as a closed surface (e.g., an ellipse, a perfect circle, or a racetrack).

The coil 2 that includes the winding portions 2A and 2B can be constituted by a coated wire in which an insulating coating made of an insulating material is provided around a conductor such as a rectangular wire or a round wire made of an electrically-conductive material such as copper, aluminum, magnesium, or an alloy of the same. In the present embodiment, a coated rectangular wire whose conductor is a rectangular wire made of copper and whose insulating coating is made of an enamel (typically a polyamidimide) is wound edgewise to form the winding portions 2A and 2B.

Two end portions 2a and 2b of the coil 2 are drawn from the winding portions 2A and 2B and connected to terminal members (not shown). An external apparatus, such as a power supply that supplies power to the coil 2, is connected to the coil 2 via these terminal members.

1.2.2 Magnetic Core

The magnetic core 3 of the present embodiment is constituted by assembling together a first core portion 3A and a second core portion 3B, which are approximately U-shaped, and two gap members 33. The first core portion 3A and the second core portion 3B have the same configuration. The core portions 3A and 3B are different from a conventional divided core with respect to having a later-described sensor disposition groove 31g.

The ring-shaped magnetic core 3 is obtained by assembling the leading ends of two protruding portions of the first core portion 3A to the leading ends of two protruding portions of the second core portion 3B via the gap members 33, 33, and for the sake of convenience, the magnetic core 3 can be divided into inner core portions 31, 31 and outer core portions 32, 32.

1.2.2.1 Inner Core Portion

The inner core portions 31 are portions of the magnetic core 3 that are disposed inside the winding portion 2A (2B) of the coil 2. Here, the inner core portions 31 in the present embodiment refer to the portions of the magnetic core 3 in which the axial direction conforms to the axial direction of the winding portions 2A and 2B of the coil 2. For example, the portions of the magnetic core 3 that are on the winding portions 2A and 2B side of the dashed lines shown in FIGS. 1 and 2 protrude from the end faces of the winding portions 2A and 2B toward the outside of the winding portions 2A and 2B, and are the inner core portions 31.

The inner core portions 31 are shaped in conformity with the inner shape of the winding portion 2A (2B), and in the present embodiment are approximately shaped as a rectangular parallelepiped. In the present embodiment, one inner core portion 31 is formed by one protruding portion of the first core portion 3A, one protruding portion of the second core portion 3B, and the gap member 33 sandwiched between these protruding portions.

The inner core portions 31 of the present embodiment are constituted by a composite material that includes a soft magnetic powder and a resin. The soft magnetic powder is an aggregate of magnetic particles constituted by a ferrous metal such as iron, or an alloy of the same (Fe—Si alloy, Fe—Ni alloy, etc.). An insulating coating constituted by phosphate or the like may be formed on the surface of the magnetic particles. Also, the resin can be, for example, thermosetting resin such as epoxy resin, phenol resin, silicone resin, or urethane resin; thermoplastic resin such as polyphenylene sulfide (PPS) resin, polyamide (PA) resin (e.g., nylon 6 or nylon 66), polyimide resin, or fluorocarbon resin; room-temperature setting resin; or low-temperature setting resin.

As an alternative to the present embodiment, the inner core portion 31 can also be constituted including a magnetic body and an inner resin mold portion formed on the surface of the magnetic body. Examples of the magnetic body include a powder compact obtained by performing compact molding on a base powder that includes the aforementioned soft magnetic powder, and a laminated body obtained by laminating magnetic steel plates. The resin constituting the inner resin mold portion can be, for example, thermoplastic resin such as PPS resin, polytetrafluoroethylene (PTFE) resin, liquid crystal polymer (LCP), polyamide (PA) resin (e.g., nylon 6 or nylon 66), polybutylene terephthalate (PBT) resin, or acrylonitrile-butadiene-styrene (ABS) resin. Other examples include thermosetting resin such as unsaturated polyester resin, epoxy resin, urethane resin, and silicone resin. These resins may contain a ceramic filler such as alumina or silica in order to improve the heat dissipation performance of the resin mold portion.

Here, the gap members 33 can be a nonmagnetic material such as ceramic (e.g., alumina) or resin (e.g., polypropylene). The gap members 33 can also be constituted by an adhesive for bonding the two protruding portions of the core portions 3A and 3B.

1.2.2.2 Outer Core Portion

The outer core portions 32 are each shaped to connect end portions of the pair of inner core portions 31, 31. In the present embodiment, the outer core portions 32 are shaped as trapezoidal columns. The central portion of each outer core portion 32 in the alignment direction of the winding portions 2A and 2B protrudes more than the other portions. The magnetic path sectional area of this central portion is approximately the same as the magnetic path sectional area of the above-described inner core portions 31. Also, the face of the outer core portion 32 on the mounting plate 9 side (see FIG. 1) is flush with the surfaces of the winding portions 2A and 2B of the coil 2 that are on the mounting plate 9 side. For this reason, the outer core portion 32 comes into contact with the mounting plate 9 via the later-described junction layer 8.

Similarly to the inner core portions 31, the outer core portions 32 may also be constituted by a compact made of a composite material, or may be constituted by a magnetic body that includes an outer resin mold portion. The inner core portions 31 and the outer core portions 32 may both be constituted by a composite material or a magnetic body, a configuration is possible in which the inner core portions 31 are constituted by a composite material and the outer core portions 32 are constituted by a magnetic body, and the reverse of this is also possible. It should be noted that in the case of the core portions 3A and 3B that are constituted by the outer core portions 32 and the pair of inner core portions 31, 31 as in the present embodiment, the inner core portions 31 and the outer core portions 32 are constituted by the same material.

1.2.2.3 Sensor Disposition Groove

The first core portion 3A and the second core portion 3B each include a sensor disposition groove 31g at a position on the protruding portion that is located on the left side of the drawing when the outer core portion 32 faces the near side in the drawing. In the present embodiment, out of the two sensor disposition grooves 31g formed in the respective core portions 3A and 3B, only the sensor disposition groove 31g formed in the first core portion 3A is used. The sensor disposition groove 31g of the second core portion 3B may also be used in combination, of course. The reason that the core portions 3A and 3B both have the sensor disposition groove 31g is that the core portions 3A and 3B are both formed by the same mold in order to improve productivity.

It is sufficient that the sensor disposition groove 31g extends from a position at the end face of the winding portion 2A (2B) toward the central side in the axial direction of the winding portion 2A (2B) when the first core portion 3A and the second core portion 3B are assembled together with the coil 2. It is preferable that the extending direction of the sensor disposition groove 31g conforms to the axial direction of the winding portion 2A (2B), but it may be oblique to the axial direction. The sensor disposition groove 31g of the present embodiment is formed on the upper face of a protruding portion of the first core portion 3A that will form an inner core portion 31, and extends over the entire length of the protruding portion in a direction that conforms to the axial direction of the protruding portion (the axial direction of the inner core portion 31). In the present embodiment, the inner core portion 31 includes a protruding portion of the second core piece 3B and the gap member 33 sandwiched between these two protruding portions, and therefore the sensor disposition groove 31g extends from the vicinity of the boundary between the inner core portion 31 and the outer core portion 32 to the center in the axial direction of the inner core portion 31 (center in the axial direction of the winding portion 2A).

The sensor disposition groove 31g may be shorter than the axial length of the protruding portion, but it is preferable that the leading end reaches the end portion of the protruding portion of the first core portion 3A. According to this configuration, the portion for actually measuring the temperature in the later-described temperature sensor 5 can be guided to the center in the axial direction of the inner core portion 31. Here, a configuration is possible in which the leading end of the sensor disposition groove 31g does not reach the end portion of the protruding portion of the core portion, as with the core portion shown in FIG. 3. Even with the configuration in FIG. 3, as long as the position of the leading end of the sensor disposition groove 31g is near the end portion of the protruding portion, the leading end of the temperature sensor 5 disposed in the sensor disposition groove 31g can be guided to the vicinity of the center in the axial direction of the inner core portion 31.

The cross-sectional shape and size of the sensor disposition groove 31g can be appropriately selected according to the size of the temperature sensor 5 that is to be disposed in the sensor disposition groove 31g. The size of the sensor disposition groove 31g may be a size capable of internally housing the temperature sensor 5, or may be of a size according to which the temperature sensor 5 disposed in the sensor disposition groove 31g somewhat protrudes out from the sensor disposition groove 31g. It is possible to determine the position of the temperature sensor 5 in the inner core portion 31 regardless of the size of the sensor disposition groove 31g.

As previously described, the sensor disposition groove 31g of the present embodiment is formed on the upper face of the inner core portion 31 (the face on the upper side in the drawing of FIG. 2), but it may be provided on a side face or the lower face. It should be noted that it is preferable that the sensor disposition groove 31g is formed on the face that is the most distant from the reactor 1α installation target among the faces that constitute the inner core portion 31. Heat generated by the reactor 1α is allowed to escape to the installation target, and therefore the temperature on the installation target side of the reactor 1α tends to be lower than the temperature on the opposite side. In other words, the face of the inner core portion 31 that is most distant (upper face in the present embodiment) from the installation target, which is the heat dissipation path, is likely to reach a higher temperature than the other faces. If it is possible to measure the temperature of the portion that has a possibility of reaching the hottest temperature, the operation of the reactor 1α can be managed such that the entirety of the reactor 1α (FIG. 1) does not reach a predetermined temperature or higher.

In the case where the sensor disposition grooves 31g are formed on the upper faces of the inner core portions 31, the sensor disposition groove 31g that is actually used for disposing the temperature sensor 5 is the sensor disposition groove 31g at the position where a wiring portion 51 of the temperature sensor 5 can be easily drawn out. In the case of the present embodiment, on the joining portion 2R side of the coil 2, the position on the winding portion 2A side where the bent portion of the winding wire is located is a position where the wiring portion 51 cannot be easily drawn out. For this reason, in the present embodiment, the temperature sensor 5 is disposed in the sensor disposition groove 31g on the winding portion 2A side of the first core portion 3A. Of course, the sensor disposition groove 31g on the winding portion 2B side of the second core portion 3B can be used.

1.3 Temperature Sensor

The temperature sensor 5 includes a sensor main body 50, which is obtained by covering a thermal element such as a thermistor with a protective body or the like, and a wiring portion 51 for transmitting measured temperature information to an external apparatus such as a control apparatus. The reactor 1α is controlled based on measurement information from this temperature sensor 5. For example, if the value measured by the temperature sensor 5 is greater than or equal to a predetermined value, there is a risk of the reactor 1α becoming damaged, and therefore control is performed such that the operation of the reactor 1α is stopped in this case.

The temperature sensor 5 is disposed in the sensor disposition groove 31g that is formed in an inner core portion 31 of the magnetic core 3. The leading end of the sensor main body 50 (i.e., the portion that actually measures the temperature) is disposed in the end portion of the sensor disposition groove 31g that is on the gap member 33 side (i.e., in the center in the axial direction of the inner core portion 31). As previously described, this portion is the portion that has a possibility of reaching the highest temperature.

1.4 Other Configurations

Besides the above-described configurations, the reactor 1α of Embodiment 1 also includes adhesive sheets 4 shown in FIG. 2, and the mounting plate 9 and the junction layer 8 shown in FIG. 1, for example.

1.4.1 Adhesive Sheet

As shown in FIG. 2, the adhesive sheets 4 are members that are disposed between the outer peripheral faces of the inner core portions 31 and the inner peripheral faces of the winding portions 2A and 2B, and adhere the inner core portions 31 to the winding portions 2A and 2B. The relative positions of the coil 2 and the magnetic core 3 can be fixed using the adhesive sheets 4, thus making it possible to suppress shifting of the relative positions of the coil 2 and the magnetic core 3 due to vibration or the like. Here, in the illustrated example, the adhesive sheets 4 are provided on the upper faces of the protruding portions included in the core portions 3A and 3B. Although not shown, adhesive sheets may be disposed on the side faces and lower faces of the protruding portions as well.

Among the four adhesive sheets 4 that are illustrated, the adhesive sheet 4 that is attached to the portion where the temperature sensor 5 is disposed covers, from the outside, the temperature sensor 5 disposed in the sensor disposition groove 31g. For this reason, the adhesive sheet 4 can prevent the temperature sensor 5 from falling out of the sensor disposition groove 31g.

The adhesive sheet 4 can be constituted by insulating resin that has adhesive properties, examples of which include thermosetting resin such as epoxy resin, silicone resin, or unsaturated polyester, and thermoplastic resin such as PPS resin or LCP. The thermal conductance of the adhesive sheets 4 may be improved by including the above-described ceramic filler or the like in these types of insulating resin. If the thermal conductance of the adhesive sheets 4 is improved, the adhesive sheets 4 can be effectively used as a heat dissipation path from the magnetic core 3 to the coil 2. The thermal conductivity of the adhesive sheets 4 is preferably 0.1 W/m·K or higher, more preferably 1 W/m·K or higher, and particularly preferably 2 W/m·K or higher, for example.

The adhesive sheets 4 can be constituted by resin foam. In the case where the adhesive sheets 4 are made of resin foam, the protruding portions of the core portions 3A and 3B can be easily inserted into the winding portions 2A and 2B after the adhesive sheets 4 have been affixed to the core portions 3A and 3B. After the protruding portions have been inserted into the winding portions 2A and 2B, the coil 2 and magnetic core 3 can be fixed by causing the resin foam to foam.

1.4.2 Mounting Plate

The mounting plate 9 (FIG. 1) is a member that functions as a seat when fixing the reactor 1α to the installation target (e.g., cooling base). The mounting plate 9 is therefore required to have excellent mechanical strength. The mounting plate 9 is also required to play the role of allowing heat generated by the assembly 1 during use of the reactor 1α to escape to the installation target. The mounting plate 9 is therefore required to have excellent heat dissipation performance in addition to mechanical strength. In order to meet these requirements, the mounting plate 9 is constituted by metal. For example, aluminum or an alloy thereof, or magnesium or an alloy thereof can be used as the constituent material of the mounting plate 9. These types of metal (alloys) are advantageous in terms of having excellent mechanical strength and thermal conductance, and also being lightweight and nonmagnetic.

1.4.3 Junction Layer

The junction layer 8 is formed between the mounting plate 9 and the assembly 1 in order to join them together. This junction layer 8 also has the function of transmitting heat generated by the assembly 1 during use of the reactor 1α to the mounting plate 9.

It is sufficient that the constituent material of the junction layer 8 has insulation performance. Examples of the constituent material include thermosetting resin such as epoxy resin, silicone resin, or unsaturated polyester, and thermoplastic resin such as PPS resin or LCP. The heat dissipation performance of the junction layer 8 may be improved by including the above-described ceramic filler or the like in these types of insulating resin. The thermal conductivity of the junction layer 8 is preferably 0.1 W/m·K or higher, more preferably 1 W/m·K or higher, and particularly preferably 2 W/m·K or higher, for example.

The junction layer 8 may be formed by applying insulating resin (may be resin that contains a ceramic filler) onto the mounting plate 9, or may be formed by affixing an insulating resin sheet member onto the mounting plate 9. If a sheet is used as the junction layer 8, the junction layer 8 can be easily formed on the mounting plate 9, and therefore this is preferable.

1.5 Effects of Reactor

The reactor 1α described above can precisely measure the temperature of the magnetic core 3 during operation. In the present embodiment, the temperature sensor 5 monitors the temperature of the portion of the magnetic core 3 that has a possibility of reaching the highest temperature, and therefore it is possible to stop operation of the reactor 1α before the temperature of the magnetic core 3 rises to a temperature at which the magnetic properties of the reactor 1α degrade.

2. Second Embodiment

In a second embodiment, a reactor 1β that includes a coil 2 having only one winding portion 2C will be described with reference to FIGS. 4 and 5.

Figure 4:
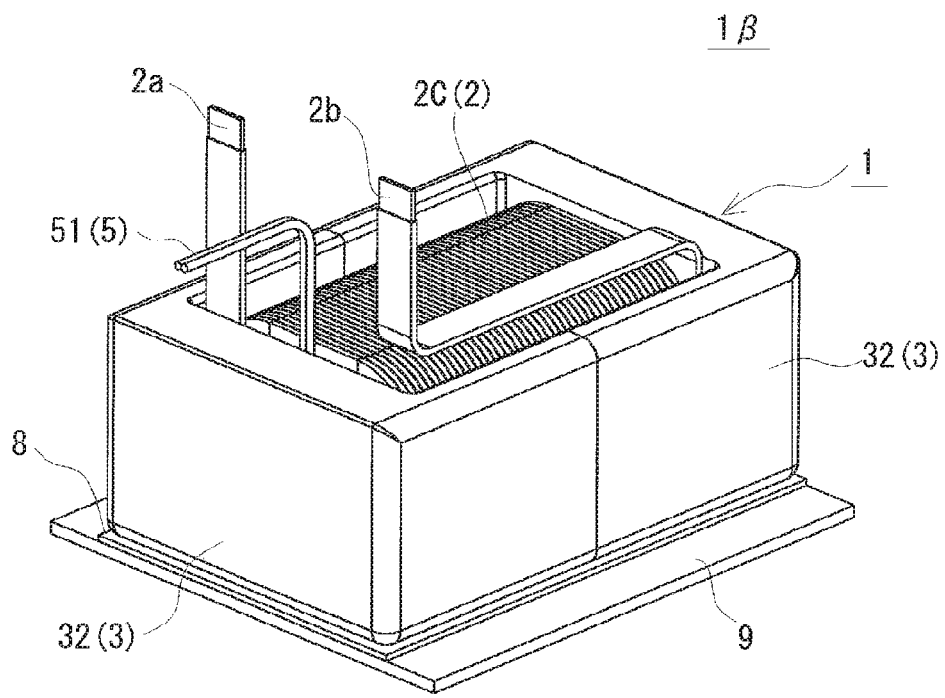
FIG. 4 is a top perspective view of a reactor of a second embodiment.

As shown in FIG. 4, the reactor 1β of the present embodiment has a configuration in which an assembly 1 approximately shaped as a rectangular parallelepiped is disposed on a mounting plate 9 via a junction layer 8. The reactor 1β is different from the reactor 1α of the first embodiment with respect to the shapes of the coil 2 and the magnetic core 3 that constitute the assembly 1. The following describes configurations of the reactor 1β with a focus on differences from the first embodiment.

As shown in FIG. 5, the coil 2 included in the assembly 1 has one winding portion 2C. An end portion 2b of the coil 2 is pulled around to the end portion 2a and drawn in the same direction as the end portion 2a.

Also, the magnetic core 3 included in the assembly 1 is constituted by assembling together a first core portion 3C and a second core portion 3D, which are approximately E shaped, with a gap member 33 sandwiched therebetween. In this case, the protruding portions in the center of the E shape constitute the inner core portion 31, and the other portions constitute outer core portions 32.

In this embodiment as well, a sensor disposition groove 31g is formed in the upper faces of the portions of the core portions 3C and 3D that constitute the inner core portion 31. Unlike the illustrated example, the sensor disposition grooves 31g may be formed with a length not reaching the end portions of the portions that constitute the inner core portion 31. Out of the two sensor disposition grooves 31g, the temperature sensor 5 is disposed in the sensor disposition groove 31g provided in the first core portion 3C. The upper face in which the sensor disposition groove 31g is formed is the face that is most distant from the installation target on which the reactor 1β is to be installed. Also, adhesive sheets 4 are attached to the upper faces of the core portions 3C and 3D where the sensor disposition grooves 31g are formed, and the inner peripheral face of the winding portion 2C and the outer peripheral face of the inner core portion 31 are adhered together.

In the reactor 1β having the above configuration as well, it is possible to monitor the temperature of the portion of the magnetic core 3 that has a possibility of reaching the highest temperature.

Variations

Although the magnetic core is constituted by assembling together two core portions in the first and second embodiments, the magnetic core may be constituted by assembling together three or more core portions. For example, in the reactor 1α of the first embodiment, the magnetic core 3 may be constituted by a pair of column-shaped core pieces that constitute inner core portions 31, and a pair of block-shaped core pieces that constitute outer core portions 32 (the core is divided into four portions). Also, in the reactor 1β of the second embodiment, the magnetic core 3 may be constituted by a column-shaped core piece that constitutes an inner core portion 31, and a pair of C-shaped core pieces that constitute outer core portions 32 (the core is divided into three portions). In both cases, the sensor disposition groove 31g is formed in each core piece that constitutes an inner core portion 31.

3. Third Embodiment

The reactors 1α and 1β that are obtained by mounting the assembly 1 onto a flat plate-shaped mounting plate 9 are described in the first and second embodiments. Alternatively, although not illustrated, a reactor can be obtained by housing the assembly 1 described in the first embodiment in a case.

This case is a member that is shaped as a bottomed tube and includes a bottom plate portion and a side wall portion. In this case, the bottom plate portion of the case also serves as the mounting plate onto which the assembly is mounted. A converter case can also be used as the case for housing the assembly.

The bottom plate portion and the side wall portion that constitute the case may be a single integrated member, or may be a bottom plate portion and a side wall portion that are prepared separately and joined at a later time. In the latter case, the bottom plate portion and the side wall portion can be constituted by different materials. As one example, the bottom plate portion is constituted by aluminum or an alloy thereof, and the side wall portion is constituted by resin such as PPS.

A configuration is possible in which after the assembly is housed in the case, the case is filled with potting resin such that the assembly is embedded in the potting resin. The potting resin physically protects the assembly 1 from the outside environment. Examples of the potting resin include epoxy resin, urethane resin, and silicone resin. The potting resin may include a ceramic filler in order to improve the heat dissipation performance of the potting resin.

The reactors according to the embodiments described above can be favorably used in an application in which the power supply conditions are, for example, a maximum current (direct current) of roughly 100 A to 1000 A, an average voltage of roughly 100 V to 1000 V, and a usage frequency of roughly 5 kHz to 100 kHz, typical examples including a constituent part of a vehicle-mounted power conversion apparatus mounted in an electric automobile, a hybrid automobile, or the like. In this application, favorable use can be expected in the case where the inductance at a DC supply of 0 A is greater than or equal to 10 µH and less than or equal to 2 mH, and the inductance at maximum current supply is at least 10% of the inductance at 0 A.

INDUSTRIAL APPLICABILITY

A reactor of the present invention can be used in a constituent part of a power conversion apparatus such as a bidirectional DC-DC converter for installation in an electric motor vehicle such as a hybrid automobile, an electric automobile, or a fuel cell automobile.

The invention claimed is:

1. A reactor comprising:
an assembly having a magnetic core and a coil that has a winding portion bounding an opening; and
a temperature sensor that measures the temperature of the reactor,
wherein the magnetic core has an inner core portion that is inserted into the opening of winding portion, and a sensor disposition groove is formed in an outer peripheral face of the inner core portion and is disposed inside the opening of the winding portion,
the inner core portion is constituted by a composite material that includes a soft magnetic powder and a resin, and
the temperature sensor is provided in the sensor disposition groove.

2. The reactor according to claim 1,
wherein the sensor disposition groove extends toward a central side in an axial direction of the winding portion.

3. The reactor according to claim 1,
wherein the sensor disposition groove is formed in, among outer peripheral faces of the inner core portion, a face that is most distant from an installation target on which the assembly is to be installed.

4. The reactor according claim 1,
comprising an adhesive sheet that is disposed between an inner peripheral face of the winding portion and the outer peripheral face of the inner core portion in which the sensor disposition groove is formed, covers the temperature sensor provided in the sensor disposition groove, and adheres together the inner core portion and the winding portion.

5. The reactor according to claim 2, wherein the sensor disposition groove is formed in, among outer peripheral faces of the inner core portion, a face that is most distant from an installation target on which the assembly is to be installed.

6. The reactor according claim 2, comprising an adhesive sheet that is disposed between an inner peripheral face of the winding portion and the outer peripheral face of the inner core portion in which the sensor disposition groove is formed, covers the temperature sensor provided in the sensor disposition groove, and adheres together the inner core portion and the winding portion.

7. The reactor according claim 3, comprising an adhesive sheet that is disposed between an inner peripheral face of the winding portion and the outer peripheral face of the inner core portion in which the sensor disposition groove is formed, covers the temperature sensor provided in the sensor disposition groove, and adheres together the inner core portion and the winding portion.

* * * * *